UNITED STATES PATENT OFFICE.

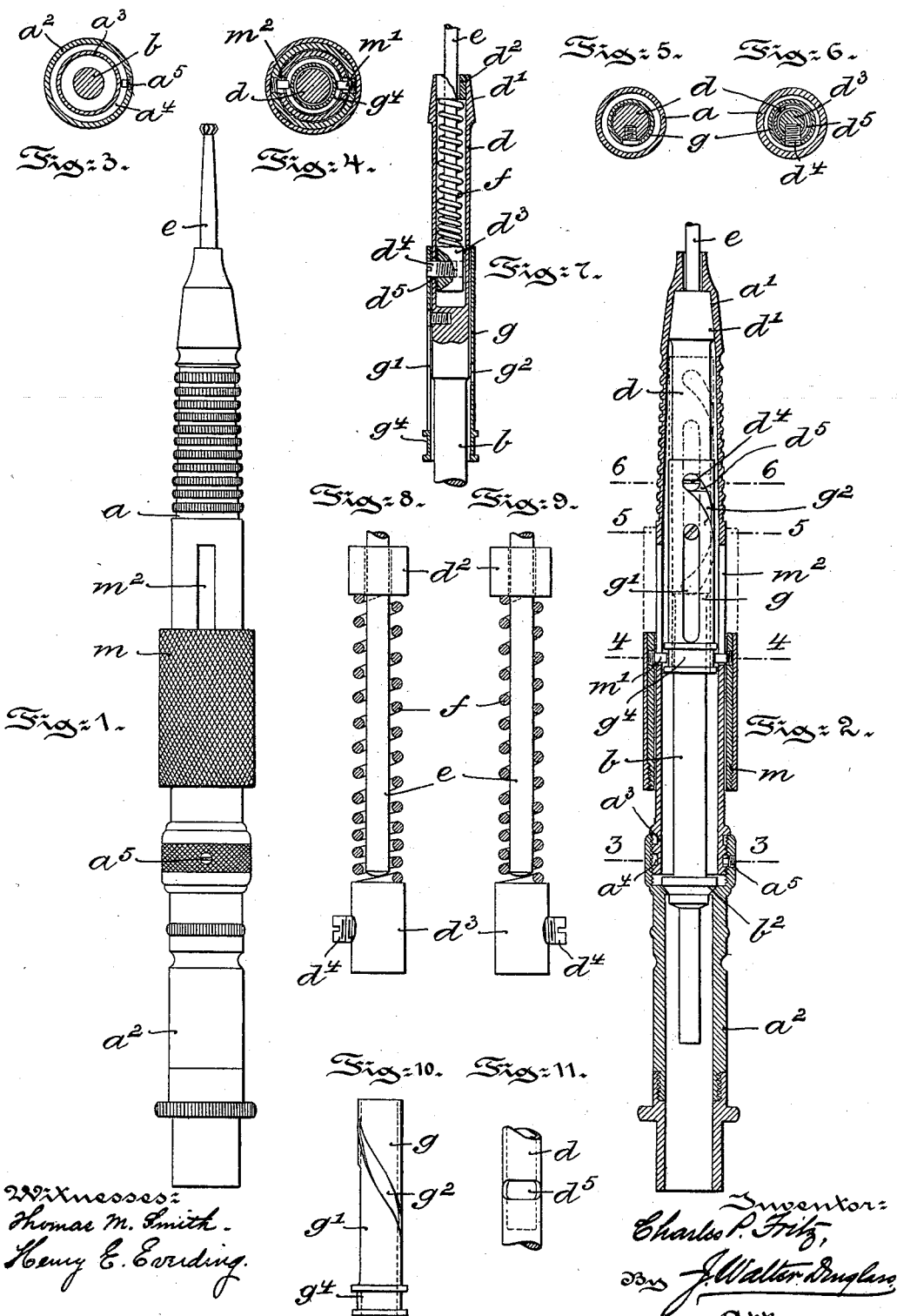

CHARLES P. FRITZ, OF PHILADELPHIA, PENNSYLVANIA, ASSIGNOR TO WILLIAM M. SPEAKMAN, OF SAME PLACE.

TOOL-HOLDER FOR DENTAL HANDPIECES.

SPECIFICATION forming part of Letters Patent No. 610,483, dated September 6, 1898.

Application filed December 28, 1897. Serial No. 663,956. (No model.)

*To all whom it may concern:*

Be it known that I, CHARLES P. FRITZ, a citizen of the United States, residing at the city of Philadelphia, in the county of Philadelphia and State of Pennsylvania, have invented certain new and useful Improvements in Drill-Holders for Dental or other Purposes, of which the following is a specification.

My invention has relation to a holder or chuck for drills especially adapted for dental use, and in such connection it relates particularly to the construction and arrangement of parts for clamping the drill to the holder or chuck, as well as to the construction and arrangement of the parts comprising the drill-holder or chuck.

The principal object of my invention is to provide a drill-holder or chuck wherein a drill having a plain unweakened shank may be quickly and easily adjusted or secured and from which it may be removed without disarranging the constituent parts of the holder or chuck; and to this end my invention consists in providing in a chuck or drill-holder a spiral spring, wherein the end of the drill is adapted to be received, and means for tightening said spring, whereby the end of the drill may be tightly secured in the chuck or holder.

The nature and scope of my invention will be more fully understood from the following description, taken in connection with the accompanying drawings, forming part thereof, in which—

Figure 1 is a side elevational view of a dental drill embodying main features of my invention. Fig. 2 is a longitudinal sectional view of Fig. 1. Figs. 3, 4, 5, and 6 are cross-sectional views taken, respectively, on the lines 3 3, 4 4, 5 5, and 6 6 of Fig. 2. Fig. 7 is a longitudinal central sectional view of the tubular head of the chuck or drill-holder adapted to receive the drill end and means for clamping the drill to the holder. Figs. 8 and 9 are side views, enlarged and partly sectioned, of the clamping-spring, the same being illustrated, respectively, in loose and tight condition with relation to the drill end inclosed therein. Fig. 10 is a side elevational view of the sleeve having the cam-groove adapted to operate the spring clamping device, and Fig. 11 is a detail view of the tubular head in which the drill is held and showing the slot therein.

Referring to the drawings, $a$ represents the external casing of the chuck or drill-holder, wherein is inclosed the spindle $b$, having at one end a tubular head $d$ for the reception of a suitable drill $e$. The head $d$ of the spindle $b$ is conical, as at $d'$, and fits into a correspondingly-shaped portion $a'$ of the external casing $a$. The other end of the spindle $b$ is provided with a conical collar $b^2$, against which is adapted to bear the correspondingly-shaped end of the auxiliary or additional casing-piece $a^2$ when the same is screwed forward upon the threaded end $a^3$ of the main casing $a$. The end $a^3$ of the casing $a$ is threaded, as illustrated in Figs. 2 and 3—that is, there are two sets of threads separated by an annular groove $a^4$, into which fits the set-screw $a^5$, which serves to securely fasten the auxiliary casing-piece $a^2$ to the casing $a$ and prevent its turning thereon. When the additional piece $a^2$ is screwed forward upon the casing $a$, it bears upon the collar $b^2$ of the spindle $b$ and tightens the spindle-head in the casing in such manner as to permit of the rotation of the spindle in the casing and to compensate for wear and tear due to the rotation of the spindle in the casing.

Within the tubular head $d$ is located the two perforated blocks or collars $d^2$ and $d^3$, the upper one, $d^2$, of which is secured in any suitable manner to the head $d$, while the other, $d^3$, is free to turn therein. Between these blocks is located a spiral or coiled spring $f$, having one of its ends firmly secured to the block $d^3$ and the other end secured either to the block $d^2$ or, if desired, directly to the spindle-head $d'$.

The block $d^3$ is provided with a pin or screw $d^4$, extending through a transverse slot $d^5$ in the tubular head $d$, as illustrated in Figs. 7 and 11, in such a manner that the pin or screw may be moved in the said slot to turn the block from left to right within the head, thereby to more tightly coil the spring $f$. Sliding on the tubular head $d$ and within the casing is a sleeve $g$, having a horizontally-arranged slot $g'$ and a spirally-arranged slot $g^2$. The slot $g'$ is arranged to receive a pin, screw, or projection on the tubular head $d$ to confine the sleeve $g$ to a longitudinal movement on said head, and the slot $g^2$ is arranged to receive the head of the pin or screw $d^4$ of the block $d^3$ and to guide said pin from left to right, and vice versa, during the forward and backward movement of the sleeve $g$. The inner end of the sleeve $g$ is provided with a grooved collar $g^4$, adapted to receive the pins $m'$, projecting inwardly through slots $m^2$ in the casing $a$ and carried by a sleeve $m$, sliding on the external surface of the casing $a$, as indicated in Figs. 1, 4, and 7 and by full and dotted lines in Fig. 2. When the external sleeve $m$ is slid forward or backward on the casing $a$, the pins $m'$ engage the grooved collar $g^4$ and give to the internal sleeve $g$ a similar movement.

In operation the parts are first indicated in full lines in Fig. 2, with the spring $f$ loosely coiled and the block $d^3$ and pin $d^4$ in the position indicated in Fig. 8. In this position the end or shank of the drill $e$ is introduced into the tubular head $d$ until it is inclosed by the coiled spring $f$. In this position the external sleeve $m$ is slid forward in the casing, moving, through its pins, the internal sleeve $g$ in a forward direction. The groove $g^2$ in said sleeve now turns the pin $d^4$ and block $d^3$ into the position illustrated in Fig. 9, thereby tightly coiling the spring $f$ down upon the shank of the drill and securely clamping the same to the tubular head $d$. Upon moving the external and internal sleeves $m$ and $g$ in a contrary direction the spring $f$ will be slightly uncoiled to permit of the withdrawal of the drill from the chuck.

Having thus described the nature and object of my invention, what I claim as new, and desire to secure by Letters Patent, is—

In a dental handpiece, the combination of a casing, a spindle mounted and adapted to rotate in suitable bearings in said casing, a hollow head formed at the end of said spindle, a spirally-coiled spring inclosed in said head adapted to receive the shank of the drill and having one end secured to said head, a sleeve mounted to slide on the exterior of the spindle-head and provided with a curved slot, a pin or screw secured to the free end of said spring adapted to work in a transverse slot formed in said spindle-head and connecting the spring to the slotted portion of the sleeve, and means controlled from the outside of the casing and adapted to slide said sleeve on the spindle-head, substantially as and for the purposes described.

In testimony whereof I have hereunto set my signature in the presence of two subscribing witnesses.

CHARLES P. FRITZ.

Witnesses:
J. WALTER DOUGLASS,
THOMAS M. SMITH.